VERTICAL RETRACE BLANKING SYSTEM UTILIZING TWO PULSES
Filed May 8, 1963
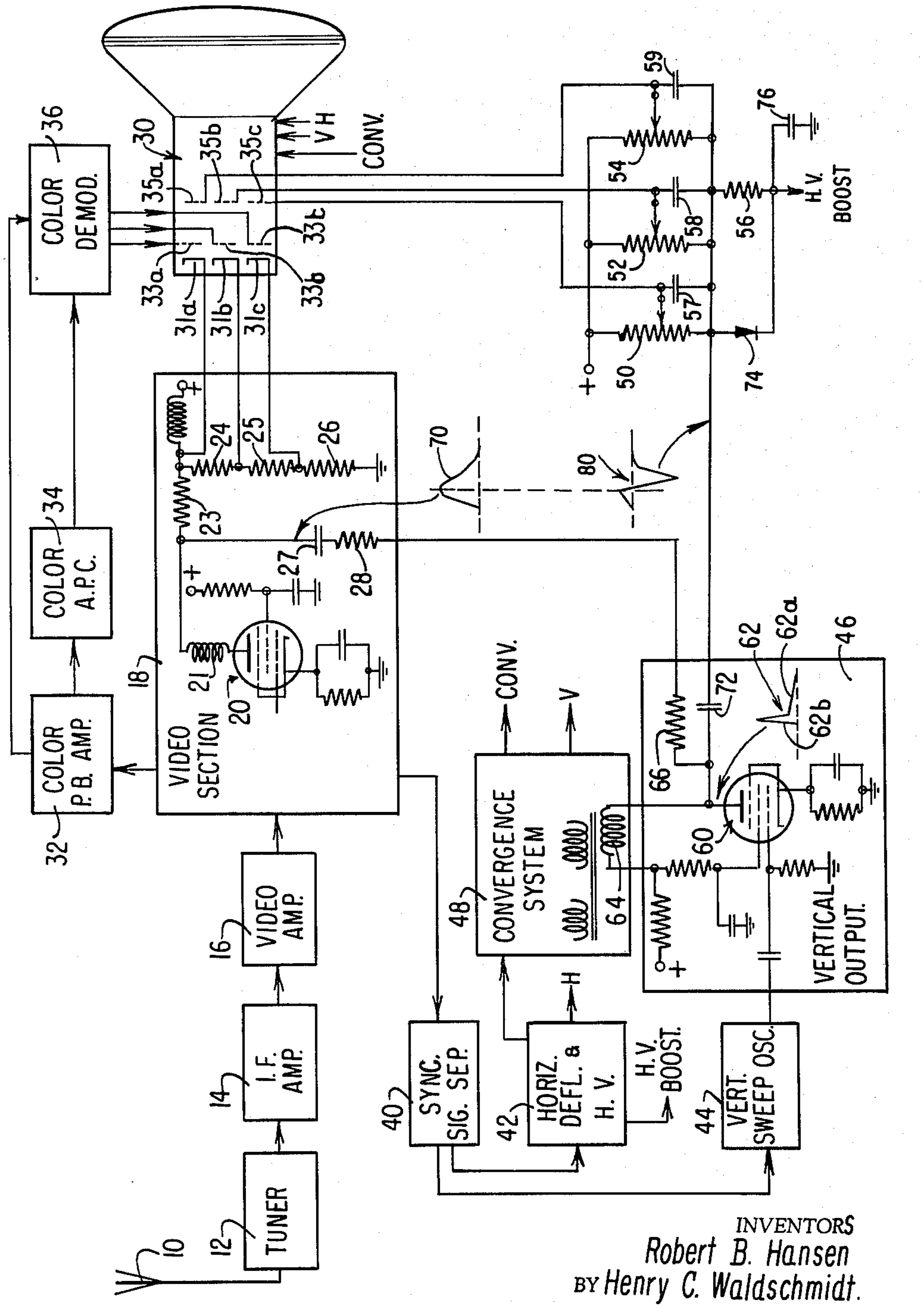
INVENTORS
Robert B. Hansen
BY Henry C. Waldschmidt
Mueller & Aichele
Attys.

United States Patent Office 3,247,418

Patented Apr. 19, 1966

3,247,418
VERTICAL RETRACE BLANKING SYSTEM UTILIZING TWO PULSES

Robert B. Hansen, Arlington Heights, and Henry C. Waldschmidt, Matteson, Ill., assignors to Motorola, Inc., Chicago, Ill., a corporation of Illinois Filed May 8, 1963, Ser. No. 278,870
10 Claims. (Cl. 315—13)

This invention relates generally to television receivers and more particularly to an improved vertical retrace blanking circuit especially useful in color television receivers.

In the reception of a composite video signal, whether or not containing chroma information components, blanking signals operative to disable the image reproducing cathode ray tube are included in the composite signal and are present in the receiver during those portions of the composite signal when video information is not being received. To insure that the retrace lines which occur during blanking intervals are not observed on the viewing screen, it is often desirable to supply additional blanking pulses derived from the sweep systems of the receiver to maintain the cathode ray tube in a cutoff condition during the retrace portion of the associated sweep systems.

In the instance of vertical blanking one known practice is to couple a pulse obtained from the vertical yoke system during the retrace interval of the sweep sawtooth wave and supply it, with appropriate polarity, to either the cathode or a grid electrode of the cathode ray tube. However, such a pulse occurs immediately after the start of retrace and is of limited amplitude and duration, resulting in less than satisfactory performance in color television receivers in which the cathode ray tube is operated at higher signal levels and accelerating potentials than in monochromatic receivers. The pulse energy is rapidly dissipated so that maximum blanking is obtained only during an initial interval of the retrace portion of the sweep signal. Attempts to widen the retrace pulse by integration decreases its peak amplitude and may result in poor blanking over the entire vertical blanking interval.

It is therefore among the objects of the present invention to provide an improved vertical retrace blanking circuit for television receivers.

Another object is to provide a vertical retrace blanking circuit for use in color television receivers which results in effective blanking over the entire retrace interval.

A further object is to provide an improved vertical retrace blanking circuit for use with color television receivers to insure that vertical retrace lines are not visible during the entire vertical blanking interval.

Still another object is to provide an economical vertical retrace blanking circuit which requires a minimum number of circuit components which can be readily incorporated in color television receivers with a minimum of circuit modification to result in improved retrace blanking.

A feature of the present invention is the provision of a vertical retrace blanking circuit in which a composite of both positive and negative pulses are utilized to successively control both the cathode and a grid electrode of the image reproducing device of a color television receiver for improved blanking over the entire retrace interval.

Another feature is the provision of a retrace blanking circuit which supplies a positive going pulse to the video amplifier stages of a television receiver to thereby disable the cathode circuit of the cathode ray tube during a first interval of vertical retrace and which supplies a negative going pulse to the screen grid circuit of the cathode ray tube to provide blanking during a second interval of vertical retrace.

A further feature is the provision, in a retrace blanking circuit for color television receivers wherein a positive going pulse derived from the vertical sweep output amplifier is utilized to disable the cathode ray tube during an initial interval of retrace, of a differentiating and clipping circuit arrangement to supply a negative going pulse, delayed in time, to a grid electrode of the cathode ray tube to cause blanking during the remaining interval of vertical retrace.

Still another feature of the invention is the provision in a vertical retrace blanking circuit of the above described type, of a resistance-capacitance network to differentiate a pulse derived from the vertical sweep output amplifier and a diode to clip positive peaks therefrom to supply a negative going pulse to the screen grid of the cathode ray tube. Such a pulse is delayed in time with respect to a positive going pulse coupled directly from the vertical sweep output amplifier and the video stages controlling the cathode of the cathode ray tube, with the two pulses resulting in effective blanking during the entire vertical retrace period.

Other objects, features and attending advantages of the invention will become apparent from the following description when taken in conjunction with the accompanying drawing, which shows a color television receiver embodying the invention.

In practicing the invention the retrace pulse appearing at the output of the vertical swep amplifier of a television receiver, exhibiting a sharp positive going peak, is coupled to the output video stage at a point which disables the cathode of the cathode ray tube during the vertical blanking period of the detected composite video signal. Preferably the retrace pulse is integrated slightly so as to insure effective blanking over substantially one-half of the retrace interval. This results in effective blanking for substantially the bottom half of the picture raster. The same pulse is also coupled to a differentiating circuit so that both positive and negative peaks are produced. The positive going peak produced by the differentiating action is removed by a diode clipping circuit. The remaining negative going peak is then supplied to a grid electrode such as the screen or second grid of the cathode ray tube. Because of the differentiating action the negative going pulse thereby produced increases as the positive going pulse coupled to the video stages for disabling the cathode of the cathode ray tube is decreasing. As a result, the negative-going pulse produces maximum blanking subsequent to maximum blanking produced by the positive-going pulse, and there is provided composite blanking of the entire picture raster during vertical retrace.

Referring now to the drawing wherein the present invention is shown incorporated in a color television receiver, the composite video signal received at antenna 10 is supplied to tuner 12. Tuner 12 may include, for example, the radio frequency stages of the receiver as well as the first detector or mixer and associated local oscillator. The output intermediate frequency signal developed by tuner 12 is coupled through intermediate frequency stages 14 to the second detector or video detector 16. The detected composite video signal is supplied from video detector 16 to the video amplifier section of the receiver, shown generally at 18. Video section 18 includes two or more impedance matching and gain stages, the final stage of which is shown representatively by pentode 20, connected as a high gain output amplifier.

The various stages employed in the video section of a television receiver are known in the art and in circuit detail form no part of the invention. The output of pentode 20 may include, for example, peaking coil 21 connected in its plate circuit as well as a plate load including resistors 23–26. Appropriate tap points on load resistors 23–26 are coupled to cathodes 31*a*, 31*b*, and 31*c* of the tri-gun assembly of cathode ray tube 30, with the tap points adjusting the output swing of pentode 20 to allow for the difference in illumination of the red, green, and blue phosphor dots arrayed on the faceplate of cathode ray tube 30. As will be hereinafter described, positive going pulses operative to disable cathode ray tube 30 during the blanking period of the composite video are derived from the vertical sweep system of the receiver and coupled to the cathode of tube 30 through an RC network including capacitor 27 and resistor 28.

Cathode ray tube 30 is of the shadow-mask tri-color type known in the art and is operable to provide color picture reproduction upon reception of a standardized composite color television signal. In addition to cathode electrodes 31*a*–31*c*, it includes control grid electrodes 33*a*–33*c* and second grid or screen grid electrodes 35*a*–35*c*. It is to be understood that in a practically constructed tube the cathode, control grid, and screen grid electrodes all form elements of the electron gun assembly, and are distinct from the focusing, accelerating, and beam-forming electrodes, not shown. Signals are applied to control grids 33*a*–33*c* from the color demodulator portion of the receiver to control the electron flow from each electron gun to the phosphor dot pattern on the face-plate of the tube. D.C. operating potentials are individually supplied to screen grids 35*a*–35*c* so that the cutoff value for each electron gun may be set with respect to the potentials applied to individual cathodes as a consequence of the difference and luminance or efficiency of the respective phosphors employed on the faceplate of cathode ray tube 30.

To provide for color reproduction when the color subcarrier sideband components are present in the received composite video signal, a portion of the output of video section 18 is further coupled to color passband amplifier 32 and hence to color demodulator 36. The color subcarrier sideband components are therein demodulated to provide red and blue color difference signals, which signals are further matrixed to derive a green color difference signal. All three color difference signals are supplied to respective grid electrodes of cathode ray tube 30 so that the electron beams of each of the three guns may be modulated by a different one of the three primary colors. Color subcarrier sideband components are demodulated by synchronous detection in color demodulator 36, which demodulator further receives a reference signal from color automatic phase control circuit 34. This reference signal may be produced by a crystal oscillator which is phase-locked to the color burst reference signal that also accompanies the received composite color signal. Systems of this type are well known in the art and need not be discussed in further detail.

A portion of the detected composite video signal is also supplied from video section 18 to synchronizing signal separator circuit 40. This circuit functions in the known manner to provide synchronizing pulses to the horizontal deflection and high voltage circuit 42 and vertical sweep oscillator 44. The output of vertical sweep oscillator 44 is further amplified by vertical sweep output stage 46 and coupled to convergence system 48 of the receiver, as is the output of horizontal deflection circuit 42. Horizontal and vertical deflection voltages are further coupled to the deflection elements (not shown) of the receiver to provide the line and field sweeps necessary for interlace scanning.

As previously mentioned, individual operating potentials are supplied to screen grid electrodes 35*a*–35*c* of cathode ray tube 30. To this end, one end of each of potentiometers 50, 52 and 54 are connected to a source of positive potential (approximately 385 v.), with the other ends thereof commonly connected through resistor 56 to the high voltage boost of the receiver. The high voltage boost, normally associated with horizontal deflection and high voltage system 42, functions in a known manner to provide a voltage in the order of 750 volts. Thus, the center arms or tap points of potentiometers 50, 52, and 54 are adjustable to supply operating potentials in the range of 385 to approximately 750 volts to supply the high screen or second grid voltages required by color cathode ray tubes. The center arm of each of the potentiometers 50, 52 and 54 is connected to respective screen grid electrodes 35*a*, 35*b* and 35*c* of cathode ray tube 30. This point on each potentiometer is further bypassed by capacitors 57, 58 and 59, respectively, to prevent A.C. signals from being developed across the portion of potentiometers supplying screen voltage.

Vertical output amplifier 46 includes pentode 60 connected to amplify the sawtooth vertical sweep signals produced by vertical sweep oscillator 44. Accordingly, there appears at the anode of pentode 60 vertical sweep waveform 62, having a trace portion 62*a* and a retrace portion 62*b*. This waveform is coupled to primary winding 64 of the vertical output and convergence transformer and hence supplied to the vertical deflection yoke of cathode ray tube 30 with a reversal in polarity to provide a rising waveform for vertical sweep thereof. At the end of the sweep the energy stored in the deflection system is released to provide the pulse or spike of retrace portion 62*b* and appears as a positive going pulse at the anode of pentode 60, as shown.

To disable cathode ray tube 30 during the initial interval of vertical retrace, the anode of pentode 60 is connected through resistor 66, resistor 28, capacitor 27 and peaking coil 21 to the anode of output video amplifier stage 20. The time constant provided by resistors 66, 28 and capacitor 27 produces slight integration of retrace pulse 62*a* so that the waveform appearing at the anode of tube 20 is as shown by waveform 70 (somewhat exaggerated for purposes of illustration). Since cathodes 31*a*–31*c* of cathode ray tube 30 are maintained negative with respect to its anode and accelerating voltages, a positive going pulse applied to the anode of tube 20 and hence appearing at cathodes 31*a*–31*c* tends to reduce electron flow therein and in conjunction with the blanking period of the composite video signal insures that cathode ray tube 30 is maintained cuttoff during at least the initial position of the blanking period. However, as previously mentioned, pulse 70 may contain sufficient energy to provide effective blanking during the entire blanking period, with the result that complete blanking is obtained only over the bottom half of the picture raster during vertical retrace.

The pulse of waveform 62 is further coupled through capacitor 72 to the ends of potentiometers 50, 52 and 54 that are common with resistor 56. Diode 74 and capacitor 76 are series connected between this point and ground reference potential. Diode 74 is poled to be conductive in the presence of positive going pulses and in conjunction with capacitor 76 provides an A.C. return to ground reference potential for such pulses. In a practically constructed receiver capacitor 76 may be a bypass capacitor associated with the regulation circuit of horizontal deflection and high voltage system 42. One end of resistor 56 is further connected to the junction point of diode 74 and capacitor 76 to provide an A.C. return to ground reference potential for signals which are not passed by diode 74. Pulse 62 is differentiated by capacitor 72 and resistor 56 to produce a positive going spike concurrent with the rising leading edge of pulse 70 and a negative going spike concurrent with the falling trailing edge of pulse 70. The positive going spike is clipped by diode 74 and capacitor 76 to produce resulting waveform 80. The positive going portion of waveform 80, relatively small in comparison to its negative portion, results from reverse biasing of diode 74 by a voltage drop across resistor 56, while its relatively high amplitude negative going portion is the result of the differentiation produced by capacitor 72 and resistor 56 with diode 74 non-conducting. It can be seen from a comparison of waveforms 70 and 80, that the negative going peak of pulse 80 is delayed in time with respect to the positive going peak of pulse 70, and increases as waveform 70 decreases.

Pulse 80 is coupled through capacitors 57, 58 and 59 to respective ones of screen grids **35*a*–35*c*. The negative going portion of the pulse supplied to screen grids 35*a*–35*c*, in conjunction with the vertical blanking signal supplied to cathodes 31*a*–31*c*, provides cutoff for cathode ray tube 30. This cutoff action is delayed in time with respect to the cutoff provided by pulse 70, and increases as pulse 70 decreases so that the picture raster is effectively blanked during the second half of the retrace interval. Accordingly, the composite blanking caused by the action of pulses 70 and 80**, both occurring during the vertical blanking interval of the composite video signal, provides effective vertical retrace blanking during the entire retrace interval.

In a practically constructed circuit employing a 6HB6 pentode as the video output stage and a 6EZ5 pentode as the vertical sweep output tube, the following component values were used:

| | |
|---|---|
| Capacitor **27** | .01 microfarad. |
| Resistors **28, 66** | 47,000 ohms. |
| Potentiometers **50, 52, 54** | 3.4 megohms. |
| Resistor **56** | 39,000 ohms. |
| Capacitors **57, 58, 59** | .001 microfarad. |
| Capacitor **72** | 680 picofarads. |
| Diode **74** | 35 ma. (max.) forward current, 200 v. PIV. |
| Capacitor **76** | .047 microfarad. |

The invention provides therefore an improved vertical retrace blanking circuit particularly useful in color television receivers wherein the retrace pulses derived from the deflection system may contain insufficient energy to produce effective blanking over the entire retrace interval. Composite blanking is achieved by supplying a positive going pulse to the video output stage so as to disable the cathode circuit of the cathode ray tube during the initial portion of the blanking interval and a negative going pulse, delayed in time with respect to positive going pulse, is applied to the screen grids of the cathode ray tube so that it is disabled during the remainder portion of the blanking interval. The circuit is simple in construction and reliable in operation, and may be readily incorporated into a television receiver by the addition of a minimum number of component parts.

We claim:

1. In a television receiver, the vertical retrace blanking system for disabling the cathode ray tube of said receiver during the retrace interval of a vertical sweep signal applied thereto, including in combination, a source of recurring vertical sweep signals in said receiver, which signals have a trace portion and a retrace portion, first circuit means for deriving first pulses of a given polarity in response to the retrace portion of said sweep signals and coupling the same to the cathode circuit of said cathode ray tube, said first pulses operative to cutoff said cathode ray tube during an initial interval of the retrace portion of said sweep signals, and second circuit means for deriving second pulses of a polarity opposite to said given polarity in response to the retrace portion of said sweep signals and coupling the same to a grid electrode of said cathode ray tube, said second pulses delayed in time with respect to said first pulses to thereby provide cutoff of said cathode ray tube during a second interval of the retrace portion of said sweep signals.

2. In a television receiver, the vertical retrace blanking system for disabling the cathode ray tube of said receiver during the retrace of vertical sweep signals applied thereto, including in combination, a source of recurring sweep signals in said receiver, which signals have a trace portion and a retrace portion, first circuit means including a resistance-capacitance network coupled between said sweep signal source and the cathode circuit of said cathode ray tube to apply first pulses of a given polarity in response to the retrace portion of said sweep signals thereto, said first pulses operative to cutoff said cathode ray tube during an initial interval of the retrace portion of said sweep signals, and second circuit means including a differentiating network and diode clipping means coupled between said sweep signal source and the screen grid circuit of said cathode ray tube to apply second pulses of a polarity opposite to said given polarity in response to the retrace portion of said sweep signals thereto, said second pulses delayed in time with respect to said first pulses and operative to cutoff said cathode ray tube during a subsequent interval of the retrace portion of said sweep signal, thereby effectively blanking said cathode ray tube during the entire retrace of said sweep signals.

3. In a television receiver having a cathode ray tube with a plurality of electron guns for reproducing a color image in response to a composite color video signal, which cathode ray tube has a plurality of cathode electrodes and a plurality of screen grid electrodes, the vertical retrace blanking circuit including in combination, a source of recurring vertical sweep signals, which signals have a trace portion and a retrace portion, first circuit means for deriving first pulses of a given polarity in response to the retrace portion of said sweep signal and supplying said pulses to said cathode electrodes, said first pulses operative to cutoff said cathode ray tube during an initial interval of the retrace portion of said sweep signals, and second circuit means for deriving second pulses of a polarity opposite to said given polarity in response to the retrace portion of said sweep signals and applying same to the screen grid electrodes of said cathode ray tube, said second pulses delayed in time with respect to said first pulses to thereby cutoff said cathode ray tube during a subsequent interval of the retrace portion of said sweep signals.

4. In a television receiver having a cathode ray tube with a plurality of electron gun assemblies for reproduction of a color image in response to a composite color video signal, which cathode ray tube has a plurality of cathode and screen grid electrodes, the vertical retrace blanking circuit including in combination, a source of recurring vertical sweep signals, which signals have a trace portion and a retrace portion, first circuit means including a resistance-capacitance network coupled between said sweep signal source and said cathode electrodes to apply first pulses of a given polarity in response to the retrace portion of said sweep signals thereto, said first pulses operative to cutoff said cathode ray tube during an initial interval of the retrace portion of said sweep signals, and second circuit means including a differentiating network and diode clipping means coupled between said sweep signal source and said screen grid electrodes to supply second pulses of a polarity opposite to said first polarity in response to the retrace portion of said sweep signals thereto, said second pulses delayed in time with respect to said first pulses and operative to cutoff said cathode ray tube during a subsequent interval of the received portion of said sweep signal, thereby effectively blanking said cathode ray tube during the entire retrace portion of said sweep signals.

5. In a television receiver having an image reproducing cathode ray tube with cathode and screen grid electrodes, signal processing means including video amplification means for applying a composite video signal to said cathode electrode, circuit means for applying operating potentials to said screen grid electrode, and a source of recurring vertical sweep signals, which sweep signals have a trace portion and a retrace portion, the vertical retrace blanking system including in combination, a resistance-capacitance network coupled between said source of recurring vertical sweep signals and said video amplification means, said resistance-capacitance network supplying first pulses of a given polarity to said video amplification means during an initial interval of the retrace portion of said sweep signals operative to cutoff said cathode ray tube, and differentiating and clipping circuit means coupled between said source of sweep signals and said circuit means for applying operating potentials to said screen grid electrode, said differentiating and clipping circuit means supplying second pulses of a polarity opposite to said given polarity to cutoff said cathode ray tube during a subsequent interval of the retrace of said sweep signals.

6. In a television receiver having an image reproducing cathode ray tube with a plurality of electron guns for the reproduction of a color image, with each said electron gun having cathode and screen grid electrodes, signal processing means including video amplification means for applying a composite video signal to said cathode electrodes, circuit means for applying operating potentials to said screen grid electrodes, and a source of recurring vertical sweep signals, which sweep signals have a trace portion and a retrace portion, the vertical retrace blanking system including in combination, circuit means including a resistance-capacitance network series connected between said source of recurring vertical sweep signals and said video amplification means, said resistance-capacitance network applying first pulses of a given polarity to said video amplification means during an initial interval of the retrace portion of said sweep signals and operative to cutoff said cathode ray tube, and second circuit means including a differentiating network and a clipping diode coupled between said source of sweep signal and said circuit means for applying operating potentials to said screen grid electrodes, with said second circuit means supplying second pulses of a polarity opposite to said given polarity to said screen electrodes to cutoff said cathode ray tube subsequent to cutoff thereof by said first pulses.

7. In a television receiver having sweep circuit means with an output terminal for supplying recurring vertical sweep signals to the deflection systems of the cathode ray tube therein, which sweep signals have a trace portion and a retrace portion, with said cathode ray tube having at least one electron gun associated therewith having cathode and screen grid electrodes, video amplification means having circuit means for applying detected composite video signals to said cathode electrodes, and circuit means for applying operating potentials to said screen grid electrodes, the vertical retrace blanking circuit including in combination, resistance means and capacitance means series coupled between the output terminal of said sweep signal source and said video amplification means to apply first blanking pulses thereto in response to the retrace portion of said sweep signals, said first blanking pulses operative to cutoff said cathode ray tube during an initial interval of the retrace portion of said sweep signals, a differentiating network connected between the output terminal of said sweep signal source and said circuit means for applying operating potentials to said screen grid electrodes, and a clipping network including a diode connected between the said circuit means for applying operating potentials to said screen grid electrodes and ground reference potential, whereby second blanking pulses opposite in polarity and delayed in time with respect to said first blanking pulses are applied to said screen grid electrodes to cutoff said cathode ray tube during a subsequent interval of the retrace of said sweep signals.

8. In a television receiver having sweep circuit means with an output terminal for supplying recurring vertical sweep signals for the deflection system of a cathode ray tube therein, which sweep signals have a trace portion and a retrace portion, with said cathode ray tube having a plurality of electron guns each having cathode and second grid electrodes, video amplification means having circuit means for applying detected composite video signals to said cathode electrodes, and circuit means including a plurality of parallel connected voltage dividing networks for applying operating potentials to said second grid electrodes, the vertical retrace blanking circuit including in combination, resistance means and capacitance means series connected between the output of said sweep signal source and said video amplification means to apply first blanking pulses thereto in response to the retrace portion of said sweep signals, said first blanking pulses operative to cutoff said cathode ray tube during an initial interval of the retrace portion of said sweep signals, a capacitor coupled between the output terminal of said sweep signal source and one side of said voltage dividing networks, a resistor and capacitance means series connected between said one side of said voltage dividing networks and ground reference potential, with said capacitor and said resistor differentiating the output of said sweep signal source, and a diode connected in parallel with said resistor to clip one-half of said differentiated signal, whereby second blanking pulses of a polarity opposite to said first blanking pulses are supplied to said screen grid electrodes to cutoff said cathode ray tube subsequent to said first blanking pulses.

9. In a television receiver having sweep circuit means with an output terminal for supplying recurring vertical sweep signals to the deflection system of a cathode ray tube therein, which sweep signals have a trace portion and a retrace portion, with said cathode ray tube having a polarity of electron guns each having at least cathode and screen grid electrodes, video amplification means having circuit means for applying detected composite video signals to said cathode electrodes, and circuit means including a plurality of parallel connected voltage dividing networks for applying operating potentials to said screen grid electrodes, the vertical blanking circuit including in combination, resistance means and capacitance means series coupled between the output of said sweep signal source and said video amplification means to apply first blanking pulses of a positive polarity thereto in response to the retrace portion of said sweep signals, said first blanking pulses operative to cutoff said cathode ray tube during an initial portion of the vertical retrace portion of said sweep signals, a capacitor coupled between the output terminal of said sweep signal source and one side of said voltage dividing networks, a resistor and capacitance means series connected between said one side of said voltage dividing networks and ground reference potential, with the time constant of said capacitor and said resistor providing differentiation of the output of said sweep signal source, and a diode connected in parallel with said resistor and poled to conduct positive portions of said differentiated signal to ground reference potential, whereby second blanking pulses of a negative polarity are supplied to said screen grid electrodes to cutoff said cathode ray tube subsequent to cutoff thereof by said first blanking pulses.

10. In a color television receiver, the combination of, a cathode ray tube having a plurality of electron guns for the reproduction of a color image, each said electron gun having at least cathode and screen grid electrodes, signal processing means including a video amplification stage for applying a detected composite video signal to said cathode electrodes, circuit means including a plurality of voltage dividing potentiometers connected in parallel across a source of D.C. potential, each said potentiometer having an adjustable tap point connected to a respective one of said screen grid electrodes to apply an operating potential thereto, with said tap points bypassed by capacitor means to one side of said potentiometers, a vertical sweep circuit having an output terminal for supplying recurring sweep signals, said sweep signals having a trace portion and a retrace portion, a first resistor and a first capacitor series connected between the output terminal of said sweep circuit and said video amplification stage for supplying first blanking pulses of a positive polarity thereto, said first blanking pulses operative to disable said cathode ray tube during an initial interval of the retrace portion of said sweep signals, a second capacitor connected between the output terminal of said sweep circuit and said one side of said potentiometers, a second resistor and a third capacitor series connected between said one side of said potentiometers and ground reference potential, and a diode poled to conduct positive pulses through said third capacitor to ground reference potential connected across said second resistor, whereby second blanking pulses negative in polarity and delayed in time with respect to said first blanking pulses are coupled to said screen grid electrodes to thereby cut off said cathode ray tube subsequent to disablement thereof by said first blanking pulses.

No references cited.

DAVID G. REDINBAUGH, *Primary Examiner.*